United States Patent
Kuntimaddi et al.

(10) Patent No.: US 7,175,545 B2
(45) Date of Patent: Feb. 13, 2007

(54) GOLF BALLS CONTAINING INTERPENETRATING POLYMER NETWORKS

(75) Inventors: Manjari Kuntimaddi, New Bedford, MA (US); David A. Bulpett, Boston, MA (US)

(73) Assignee: Acushnet Company, Fairhaven, MA (US)

( * ) Notice: Subject to any disclaimer, the term of this patent is extended or adjusted under 35 U.S.C. 154(b) by 83 days.

(21) Appl. No.: 10/738,091

(22) Filed: Dec. 18, 2003

(65) Prior Publication Data

US 2004/0132546 A1    Jul. 8, 2004

Related U.S. Application Data

(63) Continuation-in-part of application No. 09/833,667, filed on Apr. 13, 2001.

(51) Int. Cl.
A63B 37/12    (2006.01)
A63B 37/04    (2006.01)

(52) U.S. Cl. ...................... 473/378; 473/377
(58) Field of Classification Search ......... 473/351–378
See application file for complete search history.

(56) References Cited

U.S. PATENT DOCUMENTS

| | | | |
|---|---|---|---|
| 4,468,499 A * | 8/1984 | Siegfried et al. | 525/301 |
| 5,591,803 A * | 1/1997 | Sullivan et al. | 525/196 |
| 5,968,605 A | 10/1999 | Lutz | 427/500 |
| 6,001,898 A | 12/1999 | Lutz | 523/160 |
| 6,350,793 B1 | 2/2002 | Kennedy, III et al. | 522/153 |
| 6,419,594 B1 | 7/2002 | Nesbitt et al. | 473/371 |
| 6,435,985 B1 | 8/2002 | Sullivan et al. | 473/377 |
| 6,500,495 B2 | 12/2002 | Lutz | 427/500 |
| 6,520,870 B2 | 2/2003 | Tzivanis et al. | 473/371 |
| 6,548,618 B2 | 4/2003 | Sullivan et al. | 528/76 |
| 6,561,927 B1 | 5/2003 | Sullivan et al. | 473/373 |
| 6,562,909 B2 | 5/2003 | Morgan | 525/237 |
| 6,566,415 B2 | 5/2003 | Sullivan et al. | 522/112 |
| 6,605,128 B2 | 8/2003 | Larson et al. | 51/298 |
| 2003/0027667 A1 | 2/2003 | Sullivan | 473/378 |
| 2003/0027669 A1 | 2/2003 | Sullivan | 473/378 |
| 2005/0009635 A1* | 1/2005 | Kuntimaddi et al. | 473/351 |

FOREIGN PATENT DOCUMENTS

JP        2003024471 A  *  1/2003

* cited by examiner

*Primary Examiner*—Eugene Kim
*Assistant Examiner*—Alvin A. Hunter, Jr.
(74) *Attorney, Agent, or Firm*—Bingham McCutchen LLP

(57) ABSTRACT

The present invention is directed to a method of forming a golf ball that contains an interpenetrating polymer network, or IPN, which includes at least two polymeric components, in one or more of the layers. In one preferred embodiment, the present invention is directed to a method of forming an intermediate or cover layer that contains an IPN.

20 Claims, 1 Drawing Sheet

US 7,175,545 B2

GOLF BALLS CONTAINING INTERPENETRATING POLYMER NETWORKS

This is a continuation-in-part of U.S. patent application Ser. No. 09/833,667, filed on Apr. 13, 2001, now pending. This application is incorporated by reference herein in their entirety.

FIELD OF THE INVENTION

The present invention is directed to a golf ball that contains an interpenetrating polymer network, or "IPN," including at least two polymeric components. The method of forming a golf ball containing an IPN in one or more of the layers is also an aspect of the present invention.

BACKGROUND OF THE INVENTION

Various golf balls, golf ball layers, and methods of making golf balls are generally known in the art. The centers may be fluid-filled or solid. Such golf balls may have a multilayer construction. Golf balls may have a wound layer or may be solid.

Regardless of the form of the ball, players generally seek a golf ball that embodies a beneficial combination of properties, for example, such as maximum distance, which requires a high initial velocity upon impact. Therefore, golf ball manufacturers are continually searching for new ways in which to provide golf balls that deliver the maximum performance for golfers of varying skill levels.

Polyurethane materials are sometimes used in golf ball layers to provide a beneficial mix of properties. For example, U.S. Pat. Nos. 3,147,324; 5,816,937; and 5,885,172 are directed to golf balls, or methods for making such, having a polyurethane outer cover.

U.S. Pat. No. 4,123,061 teaches a golf ball made from a polyurethane prepolymer of polyether, and a curing agent, such as a trifunctional polyol, a tetrafunctional polyol, or a diamine.

U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent and/or a difunctional glycol.

U.S. Pat. No. 3,989,568 discloses a three-component system employing either one or two polyurethane prepolymers and one or two polyol or fast-reacting diamine curing agents. The reactants chosen for the system must have different rates of reactions within two or more competing reactions.

U.S. Pat. No. 4,123,061 discloses a golf ball made from a polyurethane prepolymer of polyether and a curing agent, such as a trifunctional polyol, a tetrafunctional polyol, or a fast-reacting diamine curing agent.

U.S. Pat. No. 5,334,673 discloses a golf ball cover made from a composition of a thermosetting polyurethane prepolymer and a slow-reacting polyamine curing agent and/or a difunctional glycol. Resultant golf balls are found to have improved shear resistance and cut resistance compared to covers made from balata or SURLYN®.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent, such as tert-butyl-chloride, which induces ionic interactions in the polyurethane to produce cationic type ionomers.

PCT Publication WO 98/37929 discloses a composition for golf ball covers that includes a blend of a diisocyanate/polyol prepolymer and a curing agent comprising a blend of a slow-reacting diamine and a fast-reacting diamine. Improved "feel," playability, and durability characteristics are exhibited.

U.S. Pat. No. 5,908,358 discloses a urethane golf ball cover cured with a polyamine or glycol and an epoxy-containing curing agent. The urethane material in the golf ball cover also exhibits a tensile modulus of about 5 ksi to 100 ksi. Improved shear resistance characteristics are seen with these golf ball covers.

Interpenetrating polymer networks, or IPNs, are occasionally used to improve key physical properties or to aid in the compatibilization of the components of a polymer mixture or blend. Different kinds of IPNs and the ways in which they may be made are available from a number of sources in the literature, such as, for example, in Advances in Interpenetrating Polymer Networks, Volume 4, by Frisch & Klempner, and in Interpenetrating Polymer Networks by Klempner, Sperling, & Utracki. In addition, many patents describe compositions and methods for synthesizing various types of IPNs containing various components.

U.S. Pat. No. 5,786,426 discloses an IPN based on polyisoprene and polyurethane used for medical devices, the formation of which was accomplished by swelling a thermoplastic polyurethane with THF at an increased temperature into which cis-polyisoprene was blended and peroxide initiators were dispersed for crosslinking.

U.S. Pat. No. 5,709,948 discloses a semi-IPN prepared by reacting olefinic homopolymers with epoxy resin in the presence of an epoxy curative agent, such as a triarylsulfonium hexafluorophosphate.

U.S. Pat. No. 5,674,942 discloses a homogeneous IPN having a single glass transition temperature made by reacting a mixture of di- or poly-amines with a di- or poly-isocyanate to form a polyurea in the presence of acrylic ester monomers, to be polymerized with free radical initiators, also in the presence of tertiary amines.

U.S. Pat. No. 5,648,432 discloses a method for improving the fracture toughness, microcracking resistance, thermal and mechanical performance of high-temperature resistant polymers, such as polymers made from bis-maleimides or imide-sulfones or polysulfones, polyamides, or polyimides, by dispersing them in monomers or prepolymers of low-temperature durable polymers, such as urethane-ethers, urethane-esters, ester-esters, ether-esters, ether-amides, ester-amides, silanes, siloxanes, or diene homopolymers or copolymers.

U.S. Pat. No. 5,539,053 discloses an IPN containing a glassy polymer, such as PMMA or polyacrylates, in which acrylate monomers are polymerized with radical initiators such as azobisisobutyronitrile (AIBN) in the presence of urethane prepolymers and polyol curative agents.

U.S. Pat. No. 5,331,062 discloses IPNs containing epoxy polymers with acrylate monomers or polyurethane precursors.

U.S. Pat. No. 5,306,784 discloses a tough, processable semi-IPN made by mixing monomer precursors of polyimides having an acetylene group with monomer precursors of thermoplastic polyimides. Alternately, either set of the monomer precursors may be dispersed in monomer precursors of low modulus polymers.

U.S. Pat. No. 5,241,020 discloses the preparation of a mixture including at least two different compounds that react with each other in the absence of free radical initiators and at least one monomer having a carbon-carbon double bond that polymerizes in the presence of free radical initiators. Examples of the former component include polyurethane or poly-epoxy precursors, while examples of the latter component include acrylates, methacrylates, acrylonitriles, vinyl acetates, and other vinyl monomers.

U.S. Pat. No. 5,210,109 discloses rubber-modified IPNs prepared by swelling a crosslinked polymer in monomers, oligomers, or macromonomers of vinyl acrylates or other vinyl moieties, which are then polymerized.

U.S. Pat. No. 5,084,513 discloses the dissolution of a polyalkene, such as polyethylene or polypropylene, with monomers having vinyl aromatic or acrylate-containing moieties into which a free radical initiator is added to polymerize the monomers.

U.S. Pat. No. 4,923,934 discloses the formation of an IPN from the reaction of a blocked urethane prepolymer, a polyol, and epoxy resin, and an epoxy-catalyzing agent, such as an anhydride.

Hua et al., in J. Polym. Sci., 1999, 37, 3568, disclose an IPN based on epoxy resin and urethane acrylate formed from an epoxy-grafted polypropylene oxide and urethane acrylate precursors.

Japanese Patent Publication Nos. JP 62-014869 and JP 62-014870 disclose IPNs based on polybutadiene rubber crosslinked by vulcanization and an ionomeric phenol-formaldehyde resin network, which IPNs are used in solid golf ball centers.

U.S. Pat. Nos. 5,542,677; 5,591,803; and 6,100,336 disclose golf ball cover compositions containing blends of neutralized carboxylic acid-containing polymers with ethylene-alkyl acrylate copolymers. These patents suggest that the neutralization of the carboxylic acid-containing polymer, thus forming an ionomer, in the presence of the ethylene-alkyl acrylate copolymer may result in an IPN or alternately may cause dynamic vulcanization.

It is desirable to improve the compatibility, as well as the thermal and mechanical properties, of polymers and/or polymer blends in the core or any layer disposed therearound in golf ball applications.

SUMMARY OF THE INVENTION

The present invention relates to an interpenetrating polymer network in a golf ball. In particular, the present invention relates to a method of forming a portion of a golf ball comprising the steps of providing at least a first polymeric component and a second polymeric component, each polymeric component comprising at least one monomer, oligomer, prepolymer, or a combination thereof; sufficiently polymerizing each polymeric component sequentially or simultaneously to form a polymer or polymer network; crosslinking each polymer or polymer network to the other polymer or polymer network to form an interpenetrating polymer network ("IPN"); and forming the IPN into the portion of the golf ball, wherein each polymeric component of the mixture is polymerized by exposing the mixture to at least one energy source, at least one initiator, or a combination thereof for a time sufficient to polymerize said polymeric component.

In another embodiment, the at least one energy source is selected from the group consisting of microwave radiation, infrared radiation, visible radiation, ultraviolet radiation, x-ray radiation, gamma radiation, electron beam radiation and a combination thereof. In another embodiment, the at least one initiator is selected from the group consisting of a thermal free radical initiator, a photoinitiator, a cationic initiator, and a mixture thereof.

In a preferred embodiment, the thermal free radical initiator is selected from the group consisting of an azo compound, a peroxide, a persulfate, a redox initiator, and mixtures thereof. In another preferred embodiment, the photoinitiator is selected from the group consisting of a peroxide, an azo compound, quinine, benzophenone, nitroso compound, acyl halide, hydrazone, a mercapto compound, a pyrylium compound, a triacylimidazole, an organophosphorus compounds, a bisimidazole, a chloroalkyltriazine, a benzoate, a benzoyl compound, a benzoin ether, a benzil ketal, a thioxanthone, an acetophenone derivative, a ketone, a metallocene, a hexafluorophosphate salt, a sulfonium salt, a diacrylate, a polyol, a pyrollidone, and mixtures thereof. In yet another preferred embodiment, the cationic initiator is selected from the group consisting of a Group IA organo compound, Group IIA organo compound, aryl sulfonium salt, hexafluorometallic salt, Bronsted acid, Lewis acid, and mixtures thereof. Typically, the initiator is present in an amount of greater than about 0.1 parts per hundred of total polymer component. Preferably, the initiator is present in an amount from about 0.1 to about 15 parts per hundred of total polymer component.

In one embodiment, the polymerization of each polymeric component is subsequent or simultaneous with the crosslinking of each polymer or polymer network to the other polymer or polymer network. In another embodiment, the first polymeric component is polymerized in the presence or absence of at least a second polymeric component to form a first polymer or first polymer network. In yet another embodiment, the second polymeric component is polymerized in the presence of the first polymeric component or the first polymer or first polymer network to form a second polymer or second polymer network. In another embodiment, crosslinking of the first polymer or first polymer network to the second polymer or second polymer network occurs subsequently or simultaneously with the polymerization of the second polymeric component to form the second polymer or second polymer network. In yet another embodiment, the polymerization of each polymeric component and the crosslinking of each polymer or polymer network to the other polymer or polymer network occurs simultaneously to form an IPN.

In one embodiment, the first polymeric component and the second polymeric component include monomeric, oligomeric or prepolymeric precursors of vinyl resins; polyolefins; polyurethanes; polyureas; polyamides; polyamide/polyurethane copolymers, polyamide/polyurea copolymers, epoxy-end-capped polyurethanes, epoxy-end-capped polyureas, polyamide/polyurethane ionomers, polyamide/polyurea ionomers, acrylic resins; olefinic rubbers; polyphenylene oxide resins; polyesters; blends of vulcanized, unvulcanized or non-vulcanizable rubbers with polyethylene, polypropylene, polyacetal, nylon, polyesters, or cellulose esters; or polymers or copolymers possessing epoxy-containing, or post-polymerization epoxy-functionalized repeat units.

In a preferred embodiment, the method further comprises providing a golf ball center; and disposing the IPN about the center to provide a portion of the golf ball. In another embodiment, the IPN is included in an intermediate layer disposed about the center. In another embodiment, the IPN is included in a cover layer disposed about the center.

The present invention is also directed to a method of forming a portion of a golf ball comprising the steps of providing a first polymeric component comprising at least one monomer, oligomer, prepolymer, or a combination thereof; sufficiently polymerizing the first polymer component to form a first polymer or first polymer network; providing a second polymeric component comprising at least one monomer, oligomer, prepolymer, or a combination thereof; sufficiently polymerizing the second polymer component to form a second polymer or second polymer; and crosslinking the first polymer or first polymer network with the second polymer or second polymer network to form an IPN.

In one embodiment, the first polymeric component is polymerized by exposing the first polymeric component to a first energy source, a first initiator, or a combination thereof for a time sufficient to polymerize the first polymeric component. In a preferred embodiment, the first energy source is selected from the group consisting of microwave radiation, infrared radiation, visible radiation, ultraviolet radiation, x-ray radiation, gamma radiation, electron beam radiation and a combination thereof. In another preferred embodiment, the first initiator is selected from the group consisting of a thermal free radical initiator, a photoinitiator, a cationic initiator, and a mixture thereof. In one embodiment, the first initiator is present in an amount of greater than about 0.01 parts per hundred of the first polymeric component. In a preferred embodiment, the initiator is present in an amount from about 0.01 to about 15 parts per hundred of total polymer component.

In another embodiment, the second polymeric component is polymerized by exposing the second polymeric component to a second energy source, a second initiator, or a combination thereof for a time sufficient to polymerize the second polymeric component. In a preferred embodiment, the second energy source is selected from the group consisting of microwave radiation, infrared radiation, visible radiation, ultraviolet radiation, x-ray radiation, gamma radiation, electron beam radiation and a combination thereof. In a more preferred embodiment, the second energy source is electron beam radiation.

In another preferred embodiment, the second initiator is selected from the group consisting of a thermal free radical initiator, a photoinitiator, a cationic initiator, and a mixture thereof. In one embodiment, the second initiator is present in an amount of greater than about 0.01 parts per hundred of the first polymeric component. In a preferred embodiment, the initiator is present in an amount from about 0.01 to about 15 parts per hundred of total polymer component.

In one embodiment, the first polymeric component is polymerized in the presence or absence of at least a second polymeric component to form a first polymer or first polymer network. In another embodiment, the second polymeric component is polymerized in the presence of the first polymeric component or the first polymer or first polymer network to form a second polymer or second polymer network. In yet another embodiment, crosslinking of the first polymer or first polymer network to the second polymer or second polymer network occurs subsequently or simultaneously with the polymerization of the second polymeric component to form the second polymer or second polymer network.

In one embodiment, the first polymeric component and the second polymeric component comprise monomeric, oligomeric or prepolymeric precursors of vinyl resins; polyolefins; polyurethanes; polyureas; polyamides; acrylic resins; olefinic rubbers; polyphenylene oxide resins; polyesters; blends of vulcanized, unvulcanized or non-vulcanizable rubbers with polyethylene, polypropylene, polyacetal, nylon, polyesters, or cellulose esters; or polymers or copolymers possessing epoxy-containing, or post-polymerization epoxy-functionalized repeat units.

In one embodiment, the portion of the golf ball formed from the IPN is a core, intermediate layer or cover layer. In a preferred embodiment, the method further comprises providing a golf ball center; and disposing the IPN about the center to provide a portion of the golf ball. In a more preferred embodiment, the IPN is included in an intermediate layer disposed about the center. In another more preferred embodiment, the IPN is included in a cover layer disposed about the center.

BRIEF DESCRIPTION OF THE DRAWINGS

Further features and advantages of the invention can be ascertained from the following detailed description that is provided in connection with the drawings described below.

DEFINITIONS

Figure 1:
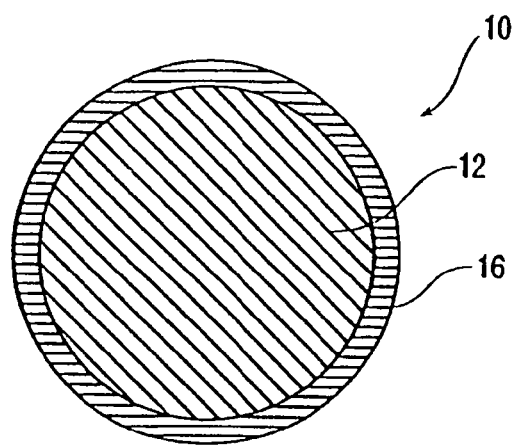
FIG. 1 illustrates a golf ball including a center and a cover layer disposed over the center, in which at least one of the center or the cover layer includes an IPN.

With respect to the present invention, all percentages are weight percentages unless otherwise indicated.

As used herein, the term "about" should be understood to modify either one or both numbers in a range of values.

As used herein, the term "golf equipment" includes any type of equipment used in connection with golf, including, but not limited to, golf clubs (i.e., putters, drivers, and wedges) and club attachments, additions, or modifications, such as striking face inserts; golf club components (e.g., shafts, hosels, and grips); golf club vibration damping devices; golf gloves; golf shoes; and any portion of the above items. For the purposes of this invention, golf equipment does not include golf balls.

As used herein, the term "fluid" includes a liquid, a paste, a gel, a gas, or any combination thereof. A "fluid-filled" golf ball center or core according to the invention also includes a hollow center or core.

In the context of the present invention, the phrase "substantially free of" an item means that there is less than about 5%, preferably less than about 2%, more preferably less than about 1% of that item present. Most preferably, it means that the item is completely free of that item.

In the context of the present invention, the term "prepolymer" refers generally to a macromonomer or partially polymerized material formed by the reaction product of at least two components, each having a functionality that is reactive with at least one other component under the appropriate circumstances, which macromonomer or partially polymerized material can be subsequently reacted with at least one other component (which may be the same as one of the at least two components or different) to form a polymer. In particular, a "prepolymer" may refer to a material containing at least one isocyanate-containing component and at least one isocyanate-reactive component, for example, such as a polyol, a polyamine, an epoxy-containing compound, or a mixture thereof. Alternatively, "prepolymers" according to the present invention may not include an isocyanate-containing component.

In the context of the present invention, a component that has a "substantial lack of" an item should be understood to have less than about 20%, preferably to have less than about 10%, more preferably to be substantially free of that item.

As used herein with regard to golf ball properties, the term "compression" refers to Atti compression, which is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in diameter.

DETAILED DESCRIPTION OF THE INVENTION

The present invention relates to one-piece golf balls, two-piece golf balls, or multilayer golf balls having a center, at least one intermediate layer disposed concentrically adjacent to the center, and a cover. The invention also relates to golf balls having a double core, a multi-layer core, a double cover, a multi-layer cover or more than one intermediate layer.

It has now been discovered that golf balls including an interpenetrating polymer network, or IPN, including at least two polymeric components can advantageously provide improved golf balls. An interpenetrating polymer network useful for the present invention may include two or more different polymers or polymer networks and can encompass any one or more of the different types of IPNs listed and described below, which may overlap:

(1) Sequential interpenetrating polymer networks, in which monomers or prepolymers for synthesizing one polymer or a polymer network are polymerized in the presence of another polymer or polymer network. These networks may have been synthesized in the presence of monomers or prepolymers of the one polymer or polymer network, which may have been interspersed with the other polymer or polymer network after its formation or cross-linking;

(2) Simultaneous interpenetrating polymer networks, in which monomers or prepolymers of two or more polymers or polymer networks are mixed together and polymerized and/or crosslinked simultaneously, such that the reactions of the two polymer networks do not substantially interfere with each other;

(3) Grafted interpenetrating polymer networks, in which the two or more polymers or polymer networks are formed such that elements of the one polymer or polymer network are occasionally attached or covalently or ionically bonded to elements of an/the other polymer(s) or polymer network(s);

(4) Semi-IPNs, in which one polymer is cross-linked to form a network while another polymer is not; the polymerization or crosslinking reactions of the one polymer may occur in the presence of one or more sets of other monomers, prepolymers, or polymers, or the composition may be formed by introducing the one or more sets of other monomers, prepolymers, or polymers to the one polymer or polymer network, for example, by simple mixing, by solubilizing the mixture, e.g., in the presence of a removable solvent, or by swelling the other in the one;

(5) Full, or "true," interpenetrating polymer networks, in which two or more polymers or sets of prepolymers or monomers are crosslinked (and thus polymerized) to form two or more interpenetrating crosslinked networks made, for example, either simultaneously or sequentially, such that the reactions of the two polymer networks do not substantially interfere with each other;

(6) Homo-IPNs, in which one set of prepolymers or polymers can be further polymerized, if necessary, and simultaneously or subsequently crosslinked with two or more different, independent crosslinking agents, which do not react with each other, in order to form two or more interpenetrating polymer networks;

(7) Gradient interpenetrating polymer networks, in which either some aspect of the composition, frequently the functionality, the copolymer content, or the crosslink density of one or more other polymer networks gradually vary from location to location within some, or each, other interpenetrating polymer network(s), especially on a macroscopic level;

(8) Thermoplastic interpenetrating polymer networks, in which the crosslinks in at least one of the polymer systems involve physical crosslinks, e.g., such as very strong hydrogen-bonding or the presence of crystalline or glassy regions or phases within the network or system, instead of chemical or covalent bonds or crosslinks; and (9) Latex interpenetrating polymer networks, in which at least one polymer or set of prepolymers or monomers are in the form of lattices, frequently (though not exclusively) in a core-shell type of morphology, which form an interpenetrating polymer network when dried, for example, as a coating on a substrate (if multiple polymers or sets of prepolymers or monomers are in the form of lattices, this is sometimes called an "interpenetrating elastomer network," or IEN).

It should be understood that an interpenetrating polymer network according to the invention should not include a copolymer network. The term "copolymer network," as used herein, can be defined as a single polymer network formed from two or more different types of monomers, oligomers, precursor packages, or polymers, during which network formation: a) the crosslinking reaction(s) result(s) in the different types of polymers, oligomers, or precursors being sufficiently inter-crosslinked, i.e., the polymers, oligomers, or precursors of one or more types are connected to polymers, oligomers, or precursors of the other different types, such that effectively one crosslinked network connecting all the different monomers, oligomers, precursors, or polymers is formed; b) the contemporaneous or consecutive polymerization reaction(s) of all the different types of monomers, oligomers, or precursors result(s) in two or more different types of copolymers, which may themselves be oligomeric or polymeric and may be precursors to (an)other type(s) of copolymer(s), and which may then undergo inter-crosslinking reaction(s), as in a), between the different types of copolymers; c) the contemporaneous or consecutive polymerization reaction(s) of all the different types of monomers, oligomers, or precursors result(s) in a single type of copolymer, which may itself be oligomeric or polymeric and may be a precursor to another type of copolymer, and which may then undergo a sufficient intra-crosslinking reaction, i.e., the copolymer chains of the single type are connected to other copolymer chains of the same type, such that effectively a single crosslinked network connecting copolymer chains is formed; or d) any combination thereof.

A grafted IPN is distinguishable from a copolymer network, in that the inter-crosslinking of a grafted IPN is only occasional, resulting in relatively few cross-type polymer linkages, while the inter-crosslinking of a copolymer network occurs relatively frequently, resulting in a relatively large amount of cross-type polymer linkages. As a result, the copolymer network is effectively a single copolymer network, while the grafted IPN according to the invention may be lightly inter-crosslinked but is effectively a combination of at least two, preferably co-continuous, polymer networks. Preferably, grafted IPNs according to the invention have a substantial lack of cross-type polymer linkages, or inter-crosslinking. In one embodiment, a layer containing a gradient IPN according to the invention has a flexural modulus below about 5 ksi.

With the exception of grafted IPNs above, all forms of crosslinking recited in the descriptions of interpenetrating polymer networks above should hereby be understood to be intra-crosslinks, or same-type polymer linkages, i.e., crosslinks between polymer chains made from the same precursor package. Still, grafted IPNs predominantly contain intra-crosslinks, but also contain a small amount of inter-crosslinks.

It should also be understood that an interpenetrating polymer network according to the invention should not include a combination of an individual polymer and a polymer network of essentially the same type as the individual polymer, i.e., for example, a single type of homopolymer or copolymer, e.g., such as PMMA, that has been: a) incompletely crosslinked, e.g., such as by incorporation of an appropriate amount of diacrylate monomer; or b) incompletely or completely crosslinked and then blended with uncrosslinked, neat PMMA, is not considered an IPN according to the present invention, despite its possible characterization as a semi-homo-IPN. Such a combination is considered a partially-crosslinked, single-polymer network or system.

Generally, IPNs improve the compatibility of polymeric components, especially in comparison to conventional polymer blends. In an interpenetrating polymer network of the present invention, the compatibility can be evidenced by comparing experimentally measured properties, such as the relative glass transition temperatures (or the difference between them, denoted as $\Delta T_g$) or the relative crystallinity or crystalline perfection (as represented by the area under the melting endotherm), if at least one component of the IPN is crystallizable. These properties may be experimentally observed by a number of different instruments, such as a differential scanning calorimeter ("DSC") or dynamic mechanical analyzer ("DMA") or dynamic mechanical thermal analyzer ("DMTA").

Preferably, the formation of an IPN reduces the $\Delta T_g$ between at least two of the polymeric components of the IPN at least about 5%, as compared with the $\Delta T_g$ between a polymer blend containing the same at least two polymeric components. In one embodiment, the formation of an IPN reduces the $\Delta T_g$ between at least two of the polymeric components of the IPN at least about 10%. In another embodiment, the formation of an IPN reduces the $\Delta T_g$ between at least two of the polymeric components of the IPN at least about 20%. In various other embodiments, the formation of an IPN reduces the $\Delta T_g$ between at least two of the polymeric components of the IPN at least about 35%, at least about 50%, and at least about 75%. In yet another embodiment, the formation of an IPN yields only one observable $T_g$ for the at least two polymeric components.

Alternately, in the case where at least two of the polymeric components of the IPN associate or interact strongly in a polymer blend, especially through hydrogen-bonding, ionic aggregation, chelation, or the like, the formation of an IPN can increase the $\Delta T_g$ between the at least two polymeric components in the IPN, in some cases at least about 5%, as compared with the $\Delta T_g$ between a polymer blend containing the same at least two polymeric components. In one such alternate embodiment, the formation of an IPN increases the $\Delta T_g$ between at least two of the polymeric components of the IPN at least about 10%. In another such alternate embodiment, the formation of an IPN increases the $\Delta T_g$ between at least two of the polymeric components of the IPN at least about 20%.

For example, in the case of a polyurethane-epoxy polymer IPN system, a polymer blend containing the polyurethane and the epoxy polymer can be made in a number of ways, such as by: grinding a cured epoxy polymer into a powder; mixing the proper proportion of the powdered epoxy polymer with the urethane precursor package components to uniformly disperse the epoxy powder, but before polymerization, gelation, or solidification occurs; and shaping the mixture into a similar shape as the IPN (e.g., a golf all or portion thereof). This procedure can advantageously be used for any blend in which at least one of the polymeric components is a thermoset material.

Preferably, the formation of an IPN reduces the absolute value of the area under the melting endotherm, often called $\Delta H_f$, of at least one of the crystallizable polymeric components of the IPN at least about 5% less than the area under the melting endotherm of a polymer blend of the same ratio of the at least one crystallizable polymeric component. In one embodiment, the formation of an IPN reduces $\Delta H_f$ of at least one of the crystallizable polymeric components of the IPN at least about 10% compared to the blend. In another embodiment, the formation of an IPN reduces $\Delta H_f$ of at least one of the crystallizable polymeric components of the IPN at least about 15% compared to the blend. In various other embodiments, the formation of an IPN reduces $\Delta H_f$ of at least one of the crystallizable polymeric components of the IPN at least about 25% compared to the blend, at least about 50% compared to the blend, and at least about 75% compared to the blend. In yet another embodiment, the formation of an IPN results in at least one of the crystallizable polymeric components being substantially free of crystallinity, as measured by $\Delta H_f$.

When performing DMA or DMTA experiments, ASTM D4065-95 was followed in analyzing sample material responses. A heating rate of no more than about 2° C./min was employed for these tests, and the thicknesses of the samples were kept within about 5% of the average thickness. When performing DSC experiments to measure the glass transition temperature, $T_g$, or the melting temperature, $T_{pm}$, of samples, ASTM D3418-99 was followed, in which the numerical value of $T_g$ represents the median temperature of the transition and the numerical value of $T_{pm}$ represents the peak extremum of the melting endotherm. When performing DSC experiments to measure the degree of crystallinity or the area under the melting endotherm, $\Delta H_f$, ASTM D3417-99 was followed.

As is very often the case in multi-polymer blend systems, two of the polymeric components may be immiscible or partially miscible, such that phase separation occurs to a certain extent. This phase separation may be visible to one of ordinary skill in the art (macrophase separation) or may only be observable through specialized characterization techniques designed to probe regions of less than about 500 microns (microphase separation). At the meeting of the at least two phases, there is a phase boundary that defines the edge of each phase. The average size of the phases of each phase separated component can be experimentally measured using, for example, atomic force microscopy, scanning electron microscopy, transmission electron microscopy, or other appropriate characterization apparatus.

In a preferred embodiment, the formation of an IPN, in which two of the polymeric components may be immiscible or partially miscible, results in an average phase size of each phase separated component that can be considerably less than the average phase size of each phase separated component in a blend of two or more of the components. In one embodiment, the formation of an IPN results in an average phase size of each phase separated component being at least about 10% smaller than a blend of the two components. In another embodiment, the formation of an IPN results in an average phase size of each phase separated component being at least about 20% smaller than a blend of the two components. In various other embodiments, the formation of an IPN results in an average phase size of each phase separated component being at least about 35% smaller than a blend of the two components, at least about 60% smaller than a blend of the two components, and at least about 85% smaller than a blend of the two components. In some cases, IPN formation can result in complete miscibility of the system, resulting in no discernible phase boundaries, while the components may have been immiscible or only partially miscible when in a blend.

In one embodiment, the formation of an IPN increases at least one of the following measurable quantities: the area under the loss modulus peak, represented by a local maximum in E", or loss tangent peak, represented by a local maximum in tan δ; the temperature range over which the loss modulus or loss tangent peak extends; the full-width at half-maximum height (FWHM) of the loss modulus or loss tangent peak; or the number of loss modulus or loss tangent peaks over a given temperature interval, as compared to the same value(s) measured for a blend of the same ratio of the at least two IPN components. In another embodiment, the formation of an IPN increases at least one of the aforementioned measurable quantities by at least about 2%, as compared to the same value(s) measured for a blend of the same ratio of the at least two IPN components. In yet another embodiment, the formation of an IPN increases at least one of the aforementioned measurable quantities by at least about 5%, as compared to the same value(s) measured for a blend of the same ratio of the at least two IPN components. In still another embodiment, the formation of an IPN increases at least one of the aforementioned measurable quantities by at least about 10%, as compared to the same value(s) measured for a blend of the same ratio of the at least two IPN components. In various other embodiments, the formation of an IPN increases at least one of the aforementioned measurable quantities by at least about 25%, by at least about 50%, and by at least about 75%, as compared to the same value(s) measured for a blend of the same ratio of the at least two IPN components. Alternately, instead of a comparison to the value(s) measured for a blend of the same ratio of the at least two IPN components, at least one of the aforementioned measure quantities can be compared to an uncrosslinked polymer of one of the at least two IPN components, a crosslinked polymer of one of the at least two IPN components, a random, block, graft, or other type of copolymer of at least two of the individual polymer components of the IPN, a crosslinked copolymer of at least two of the individual polymer components of the IPN, or some combination thereof.

It is also desirable for the cover, or the outermost layer of the cover if the cover has a plurality of layers, to exhibit a high shear resistance, which is manifest as the ability of a material to maintain its mechanical stability and integrity upon the application of a shear stress to that material. A "shear resistance rating" is a qualitative, or relative, scale for assessing the relative shear resistance of a material. The lower the shear resistance rating is, the higher the shear resistance of the material. For painted golf ball cover materials, the shear resistance rating categories from 1 to 5 are listed and described in the table below:

| Description | Rating |
| --- | --- |
| No visible damage to cover or paint | 1 |
| Paint damage only | 2 |
| Slight cover shear and/or paint damage observed | 3 |
| Moderate cover shear; fraying; and/or slight material removed | 4 |
| Extensive cover shear; heavy material removed; and/or severe material clumping | 5 |

The shear resistance rating can be determined by using a Miya™ mechanical Golf Swing Machine, commercially available from Miyamae Co., Ltd., of Osaka, Japan, to make two hits on each of about 6 to 12 substantially identical golf balls of substantially the same composition with either a sand wedge or a pitching wedge. First, the test conditions are adjusted and verified so that a control golf ball having a balata cover produces a rating of 5 on the shear resistance rating scale above. Following the calibration procedure, each experimental golf ball is tested and assigned a rating based upon visible manifestations of damage after being struck. The shear resistance rating for a golf ball cover layer of a given composition represents a numerical average of all the tested substantially identical golf balls. One alternative way to test shear resistance of a golf ball cover involves using player-testing and evaluating the results after the ball is struck multiple times with wedges and/or short irons.

In a preferred embodiment, the formation of an IPN in a layer of a golf ball according to the present invention increases the shear resistance of the cover layer of that golf ball, preferably resulting in a decrease in the shear test rating of at least 1, more preferably resulting in a decrease of at least 2, compared to the cover layer material of a conventional golf ball that is substantially free of IPN and that is made of the same components as the IPN. In that embodiment, it is preferred that the shear resistance of the cover layer of that golf ball has a shear test rating of at most 3, most preferably of at most 2.

Advantageously, the formation of an IPN in a golf ball layer may also increase the resistance to moisture penetration of that layer. IPN formation in that layer may also provide reduction in the water vapor permeability of a golf ball layer having an IPN therein. The reduced exposure of golf ball materials to water or water vapor helps inhibit degradation of or maintain the mechanical and/or chemical properties of those materials. This is particularly true when the water or moisture can facilitate degradation of molecular weight or mechanical properties of one or more components of the materials within the golf ball.

The ranges of values of several golf ball or material properties listed herein can vary, even outside their recited ranges, by the inclusion of IPNs according to the invention and, if necessary, by selectively varying at least one other property mentioned herein. Examples of such golf ball or material properties whose ranges can be varied by inclusion of an IPN include, but are not limited to, tensile or flexural modulus and impact resistance.

IPNs according to the present invention include at least two precursor packages, which correspond to the at least two polymer components or networks. Each precursor package contains at least all the compounds necessary to form one of the polymerized components of the IPN. Compounds that may be used in a precursor package include any monomers, oligomers, or pre-polymers that are to be attached to the polymer component by polymerization. Most notably in polyurethane-containing systems, a chain extender component is also included to further linearly extend a pre-polymer component. When referring to polymers synthesized by step-growth polymerization, it should be understood that monomers, oligomers, and pre-polymers refer to any or all compounds with functional groups that participate in the polymerization and are attached to the resulting step-growth homopolymer or copolymer.

Although some polymers may be formed through self-polymerization, for example, such as polystyrene from styrene monomer, when activated by heat or the appropriate energy, most chain growth polymerizations involve an initiator. The choice of initiator of use in the present invention depends on each polymer component to be synthesized, and any available initiator capable of polymerizing the selected monomers, oligomers, or pre-polymers are generally also present in a precursor package. Suitable initiators can include, for example, free radical, cationic initiators or ionic initiators. In cases where commercially available initiators contain inhibitors, the inhibitors may be separated and removed from the initiator by known methods prior to use.

The amount of radiation energy needed to sufficiently initiate polymerization, cure and/or crosslink the composition depends upon a number of factors including, for example, the chemical identity of the composition and precursors, as well as the initiator, radiation source chosen, and length of exposure time of the polymer components to the energy source. Thermal radiative sources include infrared and microwave sources. Conditions for thermal or heat initiated polymerizations typically are from about 35° C. to about 300° C., preferably from about 50° C. to about 200° C. and for a time of about fractions of minutes to about thousands of minutes. Examples of thermal free radical initiators include azo compounds, peroxides, persulfates (e.g., potassium persulfate, sodium persulfate, and ammonium persulfate), and redox initiators.

If actinic radiation is utilized, such as ultraviolet or visible light, a photoinitiator may be utilized. Upon being exposed to ultraviolet or visible light, the photoinitiator generates a free radical source or a cationic source. This free radical source or cationic source then initiates the polymerization. In free radical processes, an initiator is optional when a source of electron beam radiation, x-ray or gamma radiation energy is utilized. Thus, an initiator may be present or absent when the energy source is electron beam radiation, x-ray or gamma radiation energy. Gamma radiation and electron beam radiation are useful because of their excellent penetration at ambient temperature allows more control in the quiescent conditions. Gamma radiation and electron beam radiation are also advantageous because they require minimal cooling of the cured inks (the curing is done at ambient or room temperature), the ink are almost instantaneously cured, obviate or reduce the need for costly ventilating systems, and, in the case of low power electron beam radiation, require low energy to cure. Additionally, curing by gamma radiation or electron beam radiation allows the combination of several ink compositions in the same curing cycle, which may not be possible for thermal curing because the different ink compositions may require different temperatures or cure times. Suitable photoinitiators include, for example, those that absorb in the wavelength range from about 0.001 nm to 700 nm, preferably from about 100 nm to about 650 nm, more preferably from about 190 nm to about 600 nm. Photoinitiators include peroxides, azo compounds, quinines (e.g., substituted and unsubstituted anthraquinones, camphor quinone, alkyl-camphorquinone), benzophenones (e.g., 4-methylbenzophenone, benzophenone, 4,4'-bisdimethylamine-benzophenone, 1-hydroxycyclohexyl phenyl ketone), nitroso compounds, acyl halides, hydrazones, mercapto compounds, pyrylium compounds, triacylimidazoles, organophosphorus compounds (e.g., acylphosphine oxides, 2,4,6-trimethylbenzoyldiphenylphosphine oxide), bisimidazoles, chloroalkyltriazines, benzoates (e.g., ethyl 4-(dimethylamino)benzoate), benzoyl compounds (e.g., acrylic or methacrylic [(2-alkoxy-2-phenyl-2-benzoyl)ethyl]esters, 4-benzoyl-4'-methyldiphenyl sulfide, 1-benzoylcyclohexanol), benzoin ethers (e.g., substituted and unsubstituted $C_1$-$C_8$ alkyl benzoin ethers, such as benzoisobutyl ether), benzil ketals (e.g., benzyldimethyl ketal), thioxanthones (e.g. 2-isopropylthioxanthone and 4-isopropylthioxanthone), acetophenone derivatives (e.g., 2,2-dimethoxy-2-phenyl-acetophenone, 2,2-diethoxyacetophenone, 2,2-diacetoxyacetophenone, chlorinated acetophenone, hydroxyacetophenone), ketones (e.g., 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2-benzyl-2-dimethylamino-1-(4-morpholinophenyl)furan-1-one), metallocenes (e.g., Group VIII metallocenes, perfluorinated diphenyltitanocenes), hexafluorophosphate salts (e.g., ($\eta^5$-cyclopentadienyl)($\eta^6$-isopropylphenyl)iron(II) hexafluorophosphate, triphenylsulfonium hexafluorophosphate), sulfonium salts, diacrylates (e.g., butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate), polyols (e.g., polyethylene glycol), pyrollidones (e.g., N-vinyl pyrollidone) and mixtures thereof. Examples of commercially available photoinitiators include, but are not limited to, Vicure 10, 30 (made by Stauffer Chemical), Irgacure 184, 651, 2959, 907, 369, 1700, 1800, 1850, 819 (made by Chiba Specialty Chemicals), Darocurel 173 (made by EM Chemical), Quantacure CTX, ITX (made by Aceto Chemical), Lucirin TPO (made by BASF). Other examples of suitable photoinitiators are described in, for example, U.S. Pat. No. 6,500,495, the entirety of which is incorporated herein by reference.

Cationic initiators include Group IA or Group IIA organo compounds, aryl sulfonium salts, hexafluorometallic salts, Bronsted acids, Lewis acids or mixtures thereof. In particular, cationic initiators include sec-butyllithium, n-butyllithium, other ($C_1$-$C_{10}$)alkyllithiums, aryllithiums, sulfonic acids (e.g. sulfuric acid), phosphoric acid, perchloric acid, triflic acid, $BF_3$, aluminum halides (e.g., $AlCl_3$, $AlBr_3$), triarylsulfonium salts, diaryliudonium salts or mixtures thereof.

Peroxide and organic peroxide initiators typically are R—O—O—$R_1$, wherein R and $R_1$ are each independently selected from the group consisting of hydrogen, ($C_1$-$C_{20}$) alkyl, ($C_1$-$C_{20}$)alkylene, ($C_1$-$C_{20}$)alkylyne, ($C_1$-$C_{20}$)cycloalkyl, and substituted or unsubstituted ($C_6$-$C_{24}$)aryl, wherein aryl may be phenyl, naphthyl, biphenyl, thienyl or pyridyl and the aryl moiety may in each case be mono- to trisubstituted by F, Cl, Br, I, OH, $CF_3$, $NO_2$, CN, $OCF_3$, O-($C_1$-$C_{10}$)alkyl, $NH_2$, NH($C_1$-$C_6$)alkyl, COOH, COO($C_1$-$C_6$)alkyl. As used herein, "substituted" refers to additional moieties or groups that are attached to and found in R and $R_1$, which includes, but are not limited to, F, Cl, Br, I, OH, $CF_3$, $NO_2$, CN, $OCF_3$, O-($C_1$-$C_{10}$)alkyl, $NH_2$, NH($C_1$-$C_6$)alkyl, COOH, COO($C_1$-$C_{10}$)alkyl, ($C_1$-$C_{10}$)alkyl, ($C_2$-$C_{10}$)alkenyl, ($C_2$-$C_{10}$)alkynyl, ($C_1$-$C_{10}$)alkyl-COOH, ($C_1$-$C_{10}$)alkyl-aryl, wherein aryl may be phenyl, naphthyl, biphenyl, thienyl or pyridyl and the aryl moiety may in each case be mono-, di- or tri-substituted by F, Cl, Br, I, OH, $CF_3$, $NO_2$, CN, $OCF_3$, O-($C_1$-$C_{10}$)alkyl, $NH_2$, NH($C_1$-$C_6$)alkyl, COOH, COO($C_1$-$C_6$)alkyl.

Examples of peroxide and organic peroxide initiators include, but are not limited to, di(2-tert-butyl-peroxyisopropyl)benzene peroxide or bis(tert-butylperoxy)diisopropylbenzene, 2,5-di-(tert-butylperoxy)-2,5-dimethyl hexane, n-butyl-4,4-bis(tert-butylperoxy)valerate, lauryl peroxide, 1,1-bis(tert-butylperoxy)-3,3,5-trimethylcyclohexane, dicumyl peroxide, di-tert-butyl peroxide, di-tert-amyl peroxide, benzoyl-5-peroxide, tert-butyl hydroperoxide, benzoyl peroxide, acetyl peroxide, decanoyl peroxide, dicetyl peroxydicarbonate, di(4-tert-butylcyclohexyl) peroxydicarbonate (available under the trade designation PERKADOX 16, from Akzo Chemicals, Inc., Chicago, Ill.), di(2-ethylhexyl) peroxydicarbonate, tert-butylperoxypivalate (available under the trade designation LUPERSOL 11, from Lucidol Division., Atochem North America, Buffalo, N.Y.) and tert-butylperoxy-2-ethylhexanoate (available under the trade designation TRIGONOX 21-C50, from Akzo Chemicals, Inc., Chicago, Ill.).

Azo compounds include, but are not limited to, 4,4'-azobis(isobutyronitrile), 4,4'-azobis(cyanovalerate), 4,4'-azobis(cyanovaleric acid), 2,2'-azobis(4-methoxy-2,4-dimethylvaleronitrile) (available under the trade designation VAZO 33); 2,2'-azobis(2-amidinopropane) dihydrochloride (available under the trade designation VAZO 50); 2,2'-azobis(2,4-dimethylvaleronitrile) (available under the trade designation VAZO 52); 2,2'-azobis(isobutyronitrile) (also known as AIBN, available under the trade designation VAZO 64); 2,2'-azobis-2-methylbutyronitrile (available under the trade designation VAZO 67); 1,1'-azobis(1-cyclohexanecarbonitrile) (available under the trade designation VAZO 88), all of which are available from E.I. Dupont de Nemours and Company, Wilmington, Del., and 2,2'-azobis (methylisobutyrate) (available under the trade designation V-601 from Wako Pure Chemical Industries, Ltd., Osaka, Japan), and other azo compounds.

In one embodiment, the free radical initiator is an inhibitor-containing peroxide, such as 2,6-di-tert-butylbenzoquinone, 2,6-di-tert-butyl-4-methylene-2,5-cyclohexadiene-1-one, 2,6-di-tert-butyl-4-hydroxybenzaldehyde, 2,6-di-tert-butyl-4-isopropylphenol, 4,4'-methylene bis-(2,6-di-tert-butylphenol), 1,2-bis-(3,5-di-tert-butyl-4-hydroxyphenyl) ethane, 2,3,5,6-tetramethylbenzoquinone, 2-tert-butylhydroquinone, 2,2'-methylenebis-(4-methyl-6-tert-butylphenol), and the like, and mixtures thereof. The initiator, i.e., photoinitiator, free-radical initiator or cationic initiator, is generally present in an amount sufficient to initiate a polymerization resulting in a polymer having a number average molecular weight suitable for use in golf balls, which is typically from about 1,000 to about 10,000,000 grams/mole. Alternatively, the initiator (i.e., photoinitiator, free radical initiator or cationic initiator) may be present in an amount greater than about 0.01 parts per hundred of the polymer component, preferably from about 0.01 to about 15 parts per hundred of the polymer component, and more preferably from about 0.1 to about 10 parts per hundred of the polymer component, and most preferably from about 0.2 to about 5 parts per hundred of the total polymer component. It should be further understood that heat often facilitates initiation of the generation of free radicals in the aforementioned compounds.

In another embodiment, the initiator is selected to suit or match the radiation cure technique that is used to initiate the polymerization process. For example, a photoinitiator is used when ultraviolet ("UV") curing is the radiation cure technique. In another example, a thermal free radical initiator is used when thermal or heat curing is the radiation cure technique. It is possible to use a photoinitiator in thermal or heat curing, or a thermal free radical initiator in UV curing. Thus, the present invention encompasses the use of any initiator in conjunction with any radiation cure technique so long as the initiator that is chosen initiates the polymerization process.

In one embodiment, the free-radical source may alternatively or additionally be one or more of an electron beam, visible light, UV or gamma radiation, x-rays, or any other high-energy radiation source capable of generating free radicals. Thus, in one example, an initiator may or may not be utilized when gamma radiation, x-ray or electron beam radiation is the radiation cure technique. Such initiators form free radicals and/or cations that initiate polymerization upon exposure to gamma radiation, x-ray or electron beam radiation.

Optionally, accelerators or catalysts may be included in a precursor package to control the speed and/or duration of polymerization and/or crosslinking reaction(s), if a particular component is crosslinked. Any accelerator or catalyst known to one of ordinary skill in the art or any standard accelerator or catalyst may be used in a precursor package in the present invention. It should be understood that the accelerator or catalyst used in a given precursor package should be chosen based on the specifics of the starting materials, polymerization scheme, and crosslinking reaction, used to synthesize each polymer component or network. In one embodiment, a carboxylic acid compound may be used as an accelerator, particularly when one of the polymer components is a polyurethane.

Suitable catalysts include, but are not limited to, Lewis acids, for example, such as halides of boron, aluminum, indium, tin, antimony, any transition metal, particularly vanadium, zinc, zirconium, indium, manganese, molybdenum, cobalt, titanium, or tungsten, or mixtures thereof. Exemplary catalysts include chlorides and fluorides of boron, aluminum, or titanium, or mixtures thereof, and more preferably include boron trifluoride, aluminum trichloride, titanium (III) or (IV) chloride, or mixtures thereof. Other suitable catalysts include, but are not limited to, Lewis bases, inorganic bases, primary and secondary amines, and amides. Lewis bases are those compounds containing an atom with an unshared electron pair in its outer orbital. They are attracted to areas of reduced electron density in the molecules with which they react. The organic bases, such as tertiary amines ($R_3N$:), are representative of the more reactive-type Lewis bases suitable for curing epoxy resins. Other catalysts include, but are not limited to, oxides, such as magnesium oxide, or aluminum oxide; tertiary amines, such as N,N-dimethylaminopyridine, or benzyldimethylamine; imidazoles, such as 2-ethyl-4-methylimidazole; and phosphines, such as triphenylphosphine, or tributylphosphine. Catalysts may also include mixtures of any of these listed compounds with one or more other components.

Suitable accelerators include, but are not limited to, sulfonamides, such as benzenesulfonamide; ureas, such as 3-(p-chlorophenyl)-1,1-dimethylurea, or 3-(3,4-dichlorophenyl)-1,1-dimethylurea; and acids, such as phthalic acid, benzoic acid, or p-toluenesulfonic acid.

Optionally, additional curing agents may be added to a precursor package to facilitate the curing of a polymer component. "Curing agents," as used herein, means any compound, or combination thereof, capable of connecting at least two polymeric or oligomeric chains, precursors, or macromonomers together under appropriate circumstances. For example, in step-growth or condensation polymers, e.g., such as urethane- or urea-containing systems, a curing agent may serve to build the linear molecular weight of a single polymer molecule, to create, e.g., a crosslinked urethane/urea network, or both. As another example, in epoxy-containing systems, a curing agent may simultaneously facilitate polymerization and network formation. In most other types of polymers, frequently formed through addition polymerization, curing agents serve only to crosslink polymers that have already been fully or desirably polymerized.

Curing agents can be referred to as either "chain extenders," "crosslinkers," or both. Suitable chain extenders may vary depending on the polymers or networks included in the IPN, but, for step-growth or condensation polymers or epoxies, generally include a polyol, including, for example, telechelic diols, telechelic alkanediols, such as ethylene glycol, 1,4-butanediol, 1,6-hexanediol, and the like, or mixtures thereof; a polyamine, including, for example, telechelic diamines, telechelic alkanediamines, such as ethylenediamine, propylenediamine, and the like, or mixtures thereof; a cyclic polyol or polyamine, for example, such as diaminocyclohexane; or mixtures thereof. Suitable crosslinkers may also vary depending or networks included in the IPN, and include, but are not limited to any chain extender; a disulfide or polysulfide; a diisocyanate or polyisocyanate; excess diisocyanate or polyisocyanate; compounds containing or able to generate or activate a free radical; a form of energy able to generate or activate a free-radical, for example, such as heat, visible light, ultraviolet light, x-rays, γ-rays, other energy or radiation, or a mixture thereof; divalent or multivalent salts; or a mixture thereof. In addition, in one embodiment, the crosslinking of a network, instead of, or in addition to, covalent or ionic crosslinks, may include physical crosslinks, for example, such as those formed by hydrogen-bonding, provided that the IPN formed has the ability to substantially hold its shape at or around 25° C.

Other curing agents may be reactive upon addition to a precursor package or to a polymer component or may require activation of some sort to begin curing. Certain IPN precursors, prepolymers, or polymers, when the proper activators or initiators are used, as understood by those of ordinary skill in the art, can undergo self-polymerization, to form higher molecular weight polymers, or self-crosslinking, to form a network structure, or both. These self-reactions advantageously may be facilitated by one or more catalysts.

Certain curing agents may already be present in a precursor package as they may derive from a functional group or active site on a polymer component. Other curing agents may also be comonomers, for example, such as multifunctional compounds in step-growth polymerization reactions, such as polyamines, polyisocyanates, polyols, or the like, or mixtures thereof, or compounds containing two sites across which an addition polymerization may proceed, such as conjugated dienes, non-conjugated dienes, divinyl compounds, conjugated or non-conjugated cyclic compounds, divalent or multivalent salts, or mixtures thereof. One of ordinary skill in the art should be able to determine for a particular IPN system whether certain curing agents function as chain extenders, crosslinkers, or both. It should be understood that any curing agents already present in a precursor package or useful in another capacity in the polymer component of the IPN system shall not be considered additional curing agents for that polymer component.

Other compounds useful in polymerization of IPN components also may be optionally added to a precursor package as the situation warrants, which compounds should generally be chosen based on the specifics of the starting materials, polymerization scheme, and crosslinking reaction, used to synthesize each polymer component or network. For example, density-modifying fillers, antioxidants, processing aids, processing oils, plasticizers, dyes and pigments, as well as other additives well known to the skilled artisan may optionally be added to a precursor package of the present invention in amounts sufficient to achieve the purpose for which they are typically used. It also should be noted that these other compounds should typically not significantly degrade or be counterproductive toward polymerization or network formation of other components in the IPNs of the present invention.

IPNs of the present invention contain two or more polymers, at least one of which is crosslinked to form a network. In considering polymers useful in golf balls of the present invention, examples include crosslinked or uncrosslinked incarnations of any polymer capable of being incorporated into an interpenetrating polymer network. Particularly exemplary polymers include, but are not limited to, polyurea, polyamide/polyurethane copolymer, polyamide/polyurea copolymer, epoxy-end-capped polyurethane, epoxy-end-capped polyurea, polyamide/polyurethane ionomers, polyamide/polyurea ionomers, urethane polymers or copolymers, polymers made from an epoxy-containing precursor, polymers having backbone or pendant ester groups, polyimides or copolymers containing imide groups, polymers or copolymers containing siloxane groups, polymers or copolymers containing silane groups, acrylate polymers or copolymers (including, but not limited to, mono-, di-, tri, and/or tetra-acrylates), alkyl acrylate polymers or copolymers, alkyl alkyl-acrylate polymers or copolymers, for example, such as poly(methyl methacrylate) and the like, polyacrylic acids or poly(alkyl-acrylic acids), including, but not limited to, monomers such as acrylic acid or methacrylic acid, polymers or copolymers containing vinyl acetate repeat units, polymers or copolymers containing halogen groups, polymers or copolymers containing a uretdione group, polymers or copolymers containing an oxazolidone group, or mixtures thereof. Other examples of useful polymers may include polymers or copolymers containing or made from a conjugated diene, polymers or copolymers containing a styrenic moiety, ionomeric polymers or copolymers, or mixtures thereof. Preferred first, second or more polymeric components include monomeric, oligomeric or prepolymeric precursors of vinyl resins, polyolefins, polyurethanes, polyureas, polyamide and mixtures and copolymers thereof, such as those described in U.S. Pat. Nos. 6,646,061, 6,645,091, 6,648,776, and copending U.S. patent application Ser. No. 10/190,705, the entirety of which are incorporated herein.

In one embodiment, an IPN according to the invention may include an acrylate homopolymer or copolymer or a homopolymer or copolymer containing a conjugated diene, especially polybutadiene, but may not include both.

When a urethane polymer and a polymer made from an epoxy-containing precursor are both present in an IPN of the present invention, it is preferable that at least about 50% by weight of the IPN include the urethane polymer network, more preferably at least about 80%, most preferably at least about 90%, for golf ball applications.

Interpenetrating polymer networks according to the present invention may typically be fabricated by a number of different methods known to one of ordinary skill in the art. Such fabrication processes include, but are not limited to, the following groups of methods.

(1) At least two sets of pre-synthesized oligomeric or polymeric components are mixed together by any standard method or any method known to one of ordinary skill in the art, such as, for example, melt mixing, solvating at least one component in a solution of at least one of the other components and a solvent or solvent mixture, or forming a solution mixture from at least two solutions, each containing at least one set of components and a solvent or solvent mixture. In cases where solvent mixing is involved, the majority of the solvent or solvent mixture should be removed after mixing, for example, by evaporation, boiling, precipitation of the non-solvent components, or the like, preferably such that the IPN contains less than 10% solvent, or more preferably is substantially free of solvent. The mixing process should allow for sufficiently intimate mixing of the components, for example, such that the at least two components are at least partially co-entangled. At least one of the at least two intimately mixed components can then be crosslinked. If both components are to be crosslinked, the crosslinking can occur simultaneously or sequentially.

(2) At least one non-polymerized precursor package can be incorporated into at least one other pre-synthesized oligomeric or polymeric component, which may or may not already be a crosslinked network, which incorporation can occur by any method that facilitates intimate mixing of the at least one precursor package with the at least one pre-synthesized component, for example, such as by swelling the at least one pre-synthesized component with the at least one precursor package, optionally under an applied pressure. Once the components are intimately mixed, the at least one precursor package can then be appropriately polymerized. In the event that the at least one pre-synthesized component is/are already crosslinked and a semi-IPN is desired, a further crosslinking reaction may not be necessary. Otherwise, at least one component of the at least one precursor package, now polymerized, may be crosslinked. Alternately, at least one component of the at least one precursor package may be crosslinked and polymerized simultaneously. If the at least one pre-synthesized component is/are not already crosslinked, then the at least one pre-synthesized component and the at least one polymerized precursor package component may be crosslinked simultaneously or sequentially. Alternately, if the at least one pre-synthesized component is/are not already crosslinked and a semi-IPN is desired, at least one of either set of components can be crosslinked.

(3) The at least two precursor packages can be mixed together by any method that facilitates intimate mixing of the compounds in the at least two precursor packages. The at least two intimately mixed precursor packages can then be polymerized and/or crosslinked in any order to form an IPN of the present invention. In one embodiment, the at least two precursor packages can be polymerized simultaneously or sequentially, but not crosslinked, yielding an intimately mixed blend of the at least two polymerized precursor package components. Then, one or more of the polymerized components can be crosslinked by an appropriate crosslinking method, and, if more than one of the polymerized components are to be crosslinked, the crosslinking can be done simultaneously or sequentially. Alternately, for one or more of the polymerized components, the crosslinking reaction may occur simultaneously with the polymerization reaction. In another embodiment, at least one of the at least two intimately mixed precursor packages can be polymerized and crosslinked in the presence of the other precursor package(s), after which the subsequent steps are similar to method #2 (after the initial intimate mixing).

It should be understood that certain rapid-forming IPN systems may need to be prepared using a quick-forming process, such as reaction injection molding (RIM), which is a processing method known for use in forming articles or materials out of rapidly curing polymer systems. Thus, the faster the formation of a given IPN system, the more suitable the use of RIM to process it. Indeed, if the IPN gelation time is less than about 60 seconds, preferably less than about 30 seconds, RIM is preferred over other conventional processing techniques. In the RIM process, at least two or more reactive, low-viscosity, liquid components are generally mixed, for example, by impingement, and injected under high pressure (e.g., at or above about 1200 psi) into a mold. The reaction times for RIM system's are much faster than in conventional lower-pressure mixing and metering equipment. The precursor packages used for the RIM process, therefore, are typically much lower in viscosity to better facilitate intimate mixing in a very short time.

(4) Each of the at least two precursor packages can be at least partially polymerized separately, and preferably simultaneously, at which point the at least partially polymerized precursor packages can be mixed together in a manner sufficient to result in intimate mixing of the components of the at least two, at-least-partially-polymerized components. In some urethane-epoxy systems, the total gelation time may range from about 40 to 100 seconds. The remainder of the polymerizations of the intimately mixed components then occur simultaneously, although one polymerization may be sufficiently complete before any other. Then, after all polymerizations are sufficiently complete, one or more of the polymerized components can be crosslinked by an appropriate crosslinking method, and, if more than one of the polymerized components are to be crosslinked, the crosslinking can be done simultaneously or sequentially. Alternately, for one or more of the polymerized components, the crosslinking reaction may occur simultaneously with the polymerization reaction.

Crosslinking agents for each of the components, if necessary, may be mixed in with the pre-synthesized components initially, especially if they need to be externally activated, or may be added subsequent to the intimate mixing step, especially to avoid premature crosslinking by heating or exposure to activating energy or compounds. If activation is needed for crosslinking one or more of the at least two intimately mixed components, it is typically performed after an intimate mixing step. Activators for crosslinking may affect an agent or a part of the component itself, for example, such as a carbon-carbon double bond or a labile carbon-hydrogen bond, and generally include, but are not limited to, heat, light, UV radiation, x-rays, microwave radiation, and gamma radiation.

It should be understood that each method of crosslinking should be chosen to match up with the choice of starting materials and polymerization scheme used to synthesize each polymer component. It should also be noted that each method of crosslinking should typically not significantly degrade or be counterproductive toward polymerization or network formation of other components in the IPNs of the present invention.

The formation of an IPN, in accordance of the present invention, may involve one or more polymerization and/or crosslinking techniques to polymerize or crosslink the polymer systems of the IPN. As used herein, the phrase "polymerization and/or crosslinking techniques" refers to the optional use of one or more initiators in conjunction with the chosen radiation cure technique or techniques. Thus in one embodiment, the formation of an IPN of the present invention comprises polymerizing and/or crosslinking one or more polymers, prepolymers, oligomers and/or monomers sequentially or simultaneously using one or more polymerization and/or crosslinking techniques. In particular, the formation of an IPN comprises sequentially or simultaneously exposing one or more polymers, prepolymers, oligomers and/or monomers to: 1) an energy source selected from the group consisting of thermal/heat (i.e., microwave or infrared), UV radiation, visible radiation, electron beam radiation, x-ray radiation, gamma radiation, and combinations thereof, in the presence of an initiator; and 2) optionally one or more additional energy sources selected from the group consisting of thermal/heat (i.e., microwave or infrared), UV radiation, visible radiation, electron beam radiation, x-ray radiation, gamma radiation, and combinations thereof, in the presence of an initiator. As discussed above, the initiator is optional and can be present or absent when electron beam radiation, x-ray radiation, thermal radiation, or gamma radiation is utilized in forming an IPN.

The energy source is selected such that its exposure to one or more polymers, prepolymers, oligomers and/or monomers does not adversely or detrimentally affect crosslinking and/or polymerization reactions or the characteristics of the final crosslinked and/or polymerized IPN. In one example, an IPN comprising polyurea and acrylate requires low temperature for a fast cure of polyurea prepolymer, but curing the acrylate system generally requires heat, which adversely affects the curing of the polyurea by reducing the reaction rate and cosmetically changing cured polyurea. Electron beam radiation may be chosen to cure the acrylate because it can be utilized while avoiding the adverse or detrimental effects caused heat.

In preferred embodiment, the one or more additional energy source is electron beam radiation. In particular, the formation of an IPN comprises sequentially or simultaneously exposing one or more polymers, prepolymers, oligomers and/or monomers to: 1) an energy source selected from the group consisting of thermal radiation/heat, UV radiation, visible radiation, electron beam radiation, x-ray radiation, gamma radiation, and combinations thereof; and 2) electron beam radiation. The use of a low power electron beam source allows more efficient dosage of electrons and also helps prevent unwanted reactions with the final crosslinked/polymerized IPN.

The electron beam tube is a vacuum tube having a base end and a window end. An extended filament is disposed within the beam tube proximate to the base end. The filament generates electrons in conjunction with electron beam forming electrodes. The electrons from the filament (i.e., electron beam source) are directed toward and through the beam window of the electron beam tube. A low power electron beam tube is preferred. The beam energy from a low power beam tube is below about 125 kV (kilovolts), typically between about 15–80 kV (or any value therebetween), more typically between about 20–75 kV and most typically between about 30–65 kV. The voltage to the power supply (input voltage from about 10 to about 1,000 volts) is preferably about 110 volts (or less) and its operating power is preferably about 100 watts (or less). However, the output voltage of the beam tube may be between 20–100 kV or any value therebetween. Likewise, the operating power of the electron beam may be from about 10–1,000 watts or any value therebetween.

In one preferred embodiment, the precursor packages are mixed separately until a sufficient viscosity is attained, preferably from about 2,000 cPs to 35,000 cPs, more preferably from about 8,000 cPs to 30,000 cPs, most preferably from about 15,000 cPs to 26,000 cPs.

The golf balls of the present invention can likewise include one or more homopolymeric or copolymeric thermoplastic or thermoset materials in a center, an intermediate layer, and/or a cover, either individually or in combination with any other available materials or in a blend with any IPN according to the invention. In one embodiment, the one or more portions of the ball including IPN material will not include blends with conventional materials. One of ordinary skill in the art would know that most of the polymeric materials listed below may belong in the thermoplastic category or in the thermoset category, depending upon the nature of the repeat units, functional groups pendant from the repeat units, method of polymerization, method of formation, temperature of formation, post-polymerization treatments, and/or many other possible factors, and are suitable for use in golf balls according to the invention. The materials include, but are not limited to, the following polymers, or their set of monomeric, oligomeric, or macromonomeric precursors:

(1) Vinyl resins, for example, such as those formed by the polymerization of vinyl chloride, or by the copolymerization of vinyl chloride with vinyl acetate, acrylic esters or vinylidene chloride;

(2) Polyolefins, for example, such as polyethylene, polypropylene, polybutylene, and copolymers, such as ethylene methylacrylate, ethylene ethylacrylate, ethylene vinyl acetate, ethylene methacrylic acid, ethylene acrylic acid, or propylene acrylic acid, as well as copolymers and homopolymers, such as those produced using a single-site catalyst or a metallocene catalyst;

(3) Polyurethanes, for example, such as those prepared from diols, triols, or polyols and diisocyanates, triisocyanates, or polyisocyanates, as well as those disclosed in U.S. Pat. No. 5,334,673;

(4) Polyureas, for example, such as those prepared from diamines, triamines, or polyamines and diisocyanates, triisocyanates, or polyisocyanates, as well as those disclosed in U.S. Pat. No. 5,484,870;

(5) Polyamides, for example, such as poly(hexamethylene adipamide) and others prepared from diamines and dibasic acids, as well as those from amino acids such as poly (caprolactam), and blends of polyamides with SURLYN, polyethylene, ethylene copolymers, ethyl-propylene-non-conjugated diene terpolymer, and the like;

(6) Acrylic resins and blends of these resins with, for example, polymers such as poly vinyl chloride, elastomers, and the like;

(7) Olefinic rubbers, for example, such as blends of polyolefins with ethylene-propylene-non-conjugated diene terpolymer; block copolymers of styrene and butadiene, isoprene or ethylene-butylene rubber; or copoly(etheramide), such as PEBAX, sold by ELF Atochem of Philadelphia, Pa.;

(8) Polyphenylene oxide resins or blends of polyphenylene oxide with high impact polystyrene, for example, as sold under the trademark NORYL by General Electric Company of Pittsfield, Mass.;

(9) Polyesters, for example, such as polyethylene terephthalate, polybutylene terephthalate, polyethylene terephthalate/glycol modified and elastomers, such as sold under the trademarks HYTREL by E.I. DuPont de Nemours & Co. of Wilmington, Del., and LOMOD by General Electric Company of Pittsfield, Mass.;

(10) Blends and alloys, for example including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene, ethylene vinyl acetate, or other elastomers;

(11) Blends of vulcanized, unvulcanized, or non-vulcanizable rubbers with polyethylene, propylene, polyacetal, nylon, polyesters, cellulose esters, and the like; and

(12) Polymers or copolymers possessing epoxy-containing, or post-polymerization epoxy-functionalized, repeat units, for example, in combination with anhydride, ester, amide, amine, imide, carbonate, ether, urethane, urea, .alpha.-olefin, conjugated, or acid (optionally totally or partially neutralized with inorganic salts) comonomers, or copolymers or blends thereof.

The wound layer, if present, is typically disposed about the core and includes a tensioned thread material. Many different kinds of thread materials may be used for the wound layer of the present invention. The thread may be single-ply or may include two or more plies. Preferably, the thread of the present invention is single-ply. The thread may be selected to have different material properties, dimensions, cross-sectional shapes, and methods of manufacturing. If two or more threads are used, they may be identical in material and mechanical properties or they may be substantially different from each other, either in cross-section shape or size, composition, elongated state, and mechanical or thermal properties. Mechanical properties that may be varied include resiliency, elastic modulus, and density. Thermal properties that may be varied include melt temperature, glass transition temperature and thermal expansion coefficient.

The tensioned thread material of the wound layer may encompass any suitable material, but typically includes fiber, glass, carbon, polyether urea, polyether block copolymers, polyester urea, polyester block copolymers, syndiotactic- or isotactic-poly(propylene), polyethylene, polyamide, poly(oxymethylene), polyketone, poly(ethylene terephthalate), poly(p-phenylene terephthalamide), poly (acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof.

Threads used in the present invention may be formed using a variety of processes including conventional calendering and slitting, melt spinning, wet spinning, dry spinning and polymerization spinning. Any process available to one of ordinary skill in the art may be employed to produce thread materials for use in the wound layer. The tension used in winding the thread material of the wound layer may be selected as desired to provide beneficial playing characteristics to the final golf ball. The winding tension and elongation may be kept the same or may be varied throughout the layer. Preferably, the winding occurs at a consistent level of tension so that the wound layer has consistent tension throughout the layer.

In addition, the winding patterns used for the wound layer can be varied in any way available to those of ordinary skill in the art. Although one or more threads may be combined to begin forming the wound layer, it is preferred to use only a single continuous thread.

The cover provides the interface between the ball and a club. Properties that are desirable for the cover include good moldability, high abrasion resistance, high tear strength, high resilience, and good mold release, among others. The cover typically provides good performance characteristics and durability.

A free-radical source, often alternatively referred to as a free-radical initiator, may optionally be used in one or more layers of the golf balls according to the invention, particularly when a polymer component includes a thermoset material. The free-radical source for non-IPN components may be similar to that used in an IPN of the present invention or may be selected from the same or other suitable compounds.

The free radical source for non-IPN components is preferably a peroxide, more preferably an organic peroxide. The peroxide is typically present in an amount greater than about 0.1 parts per hundred of the total polymer component, preferably about 0.1 to 15 parts per hundred of the polymer component, and more preferably about 0.2 to 5 parts per hundred of the total polymer component. It should be understood by those of ordinary skill in the art that the presence of certain components may require a larger amount of free-radical source than the amounts described herein. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Fillers added to one or more layers of the golf ball typically include processing aids or compounds to affect rheological and mixing properties, the specific gravity (i.e., density-modifying fillers), the modulus, the tear strength, reinforcement, and the like. A density adjusting filler may be used to control the moment of inertia, and thus the initial spin rate of the ball and spin decay. Fillers are typically polymeric or inorganic in nature, and, when used, are typically present in an amount from about 0.1 to 50 weight percent of the layer in which they are included. Any suitable filler available to one of ordinary skill in the art may be used. Exemplary fillers include, but are not limited to, precipitated hydrated silica; clay; talc; glass fibers; aramid fibers; mica; calcium metasilicate; barium sulfate; zinc sulfide; lithopone; silicates; silicon carbide; diatomaceous earth; polyvinyl chloride; carbonates such as calcium carbonate and magnesium carbonate; metals such as titanium, tungsten, aluminum, bismuth, nickel, molybdenum, iron, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, cellulose flock, and leather fiber; micro balloons such as glass and ceramic; fly ash; cured, ground rubber; or combinations thereof.

Fillers may also include various foaming agents or blowing agents which may be readily selected by one of ordinary skill in the art. Foamed polymer blends may be formed by blending ceramic or glass microspheres with polymer material. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Additional materials conventionally included in golf ball compositions also may be present. These additional materials include, but are not limited to, density-adjusting fillers, coloring agents, reaction enhancers, whitening agents, UV absorbers, hindered amine light stabilizers, defoaming agents, processing aids, and other conventional additives. Stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

Methods for measuring the resiliency of golf balls are well known by those of ordinary skill in the art. One method of measuring the resiliency of a ball at impact is to utilize an air cannon or other means of propelling a ball at velocities equivalent to those of a golf club head. The balls are fired at a massive rigid block, with the inbound and outbound velocities being measured. The velocity may be measured by the use of light screens, which measure the time required for the ball to travel a fixed distance. The fixed distance divided by the transit time is equivalent to the average velocity of the ball over the fixed distance. The ratio of the outbound velocity to the inbound velocity is commonly referred to as the coefficient of restitution ("COR"). The COR is a direct measure of the resilience of a golf ball at a particular inbound velocity. Since golf balls behave in a relatively linear viscoelastic fashion, inbound ball velocity is typically functionally equivalent to club swing speed, which is set in the standardized COR test at about 125 ft/sec.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. The resultant golf balls prepared according to the invention typically will have dimple coverage greater than about 60 percent, preferably greater than about 65 percent, and more preferably greater than about 70 percent.

The golf balls typically have a coefficient of restitution of greater than about 0.7, preferably greater than about 0.75, and more preferably greater than about 0.78. Alternatively, the maximum COR of the ball is one that does not cause the golf ball to exceed initial velocity requirements established by regulating entities such as the USPGA. As used herein, the term "coefficient of restitution" (CoR) is calculated by dividing the rebound velocity of the golf ball by the incoming velocity when a golf ball is shot out of an air cannon. The CoR testing is conducted over a range of incoming velocities and determined at an inbound velocity of 125 ft/s. Another measure of this resilience is the "loss tangent," or tan *, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The golf balls also typically have a compression of no greater than about 120. In one preferred embodiment, the compression is at least about 40. In another preferred embodiment, the compression is from about 50 to 120, preferably from about 60 to 100. As used herein, the term "compression" refers to "Atti compression" and is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core. Compression values are dependent on the diameter of the article being measured.

The golf ball layers containing the IPNs according to the present invention typically have a material hardness greater than about 15 Shore A, preferably from about 15 Shore A to 85 Shore D. In one preferred embodiment, the material hardness is from about 10 to 85 Shore D. It should be understood, especially to one of ordinary skill in the art, that there is a fundamental difference between "material hardness" and "hardness, as measured directly on a golf ball." Material hardness is defined by the procedure set forth in ASTM-D2240-00 and generally involves measuring the hardness of a flat "slab" or "button" formed of the material of which the hardness is to be measured. Generally, ASTM-D2240-00 requires calibration of durometers, which have scale readings from 0 to 100. However, readings below 10 or above 90 are not considered reliable, as noted in ASTM-D2240-00, and accordingly, all the hardness values herein are within this range.

Additionally, the butadiene rubber that may be used in one or more layers of the golf balls prepared according to the present invention, in an uncured state, typically has a Mooney viscosity greater than about 20, preferably greater than about 30, and more preferably greater than about 40. Mooney viscosity is typically measured according to ASTM D1646-99.

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used. Preferably, the overall diameter of the core and all intermediate layers is about 80 percent to about 98 percent of the overall diameter of the finished ball.

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist Pinnacle Gold golf ball that gives a ball speed of about 159 to about 161 miles/hour, a launch angle of about 9.0 degrees to about 10.0 degrees, and a spin rate of about 2900 rpm to about 3100 rpm. Thus in one embodiment, the spin rate of a golf ball hit with a golf club driver under the same test conditions is between about 1200 rpm to about 4000 rpm. In a preferred embodiment, the spin rate of a golf ball hit with a golf club driver is between about 2000 rpm to about 3500 rpm, more preferably between about 2500 and 3000 rpm.

For an 8-iron ball spin test, a spin rate of a golf ball struck by a standard 8-iron club was obtained by using test conditions for a Titleist Pro V1 golf ball that gives a ball speed of about 114 to about 116 miles/hour, a launch angle of about 18.5 to about 19.5 degrees and a spin rate of about 8100 rpm to about 8300 rpm. Thus in one embodiment, the spin rate of an average, cleanly struck 8-iron shot is between 6500 rpm and 10,000 rpm. In preferred embodiment, the spin rate of an average, cleanly struck 8-iron shot under the same test conditions is between 7500 rpm and 9500 rpm, more preferably between about 8000 rpm and 9000 rpm.

Figure 2:
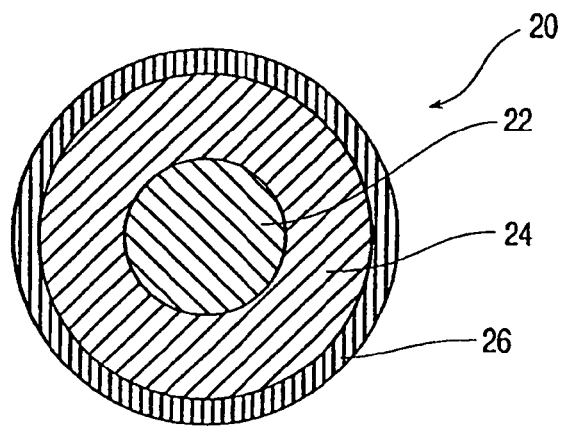
FIG. 2 illustrates a multi-layer golf ball including a center, an intermediate layer disposed over the center, and a cover layer disposed over the intermediate layer, in which at least one part of the golf ball includes an IPN.
Figure 3:
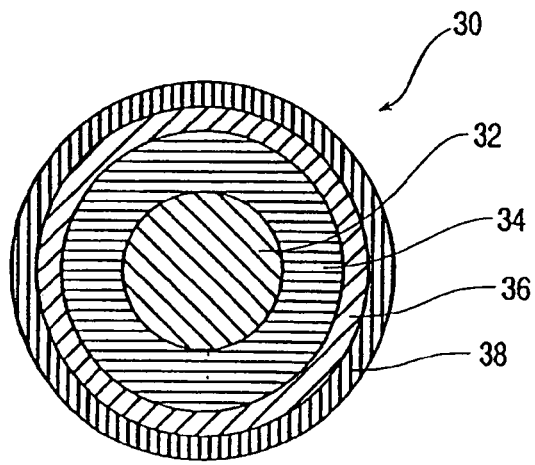
FIG. 3 illustrates a multi-layer golf ball including a core, an intermediate layer, and a cover layer disposed over the core, in which at least one part of the golf ball includes an IPN.

Referring to FIG. 1, a golf ball 10 of the present invention can include a centerb 12 and a cover 16 surrounding the center 12. Referring to FIG. 2, a golf ball 20 of the present invention can include a center 22, a cover 26, and at least one intermediate layer 24 disposed between the cover and the center. In one embodiment, the intermediate layer 24 is disposed within the core, which also includes a center 22 and may optionally include a wound layer (not shown). In another embodiment, the intermediate layer 24 is disposed outside of the core, which may optionally include a wound layer (not shown), but which is disposed under the cover layer 26. Each of the cover and center layers in FIG. 1 or 2 may include more than one layer; i.e., the golf ball can be a conventional three-piece wound ball, a two-piece ball, a ball having a multi-layer core and an intermediate layer or layers, etc. Also, FIG. 3 shows a golf ball 30 of the present invention including a center 32, a cover 38, and an intermediate layer 34 located within the core 33. Alternately, also referring to FIG. 3, a golf ball 30 of the present invention can include a center 32, a cover 38, and an intermediate layer 36 disposed between the cover and the core 33. Although FIG. 3 shows golf balls with only one intermediate layer, it will be appreciated that any number or type of intermediate layers may be used whether inside or outside the core, or both, as desired. Further, any of the FIGS. detailed herein may include embodiments wherein an optional wound layer is disposed between the center and the core of the golf ball.

In the golf balls of any of the aforementioned FIGS., the layer containing the IPN material may be outside the core or the center, in one embodiment. In another embodiment, the layer containing the IPN material may be inside the cover layer. In yet another embodiment, the layer containing the IPN material may be in any layer of the golf ball.

Although the disclosure herein focuses on a method of making an IPN layer for golf balls, it is also easily applicable by one of ordinary skill in the art to the manufacture of other items, such as curing adhesives (e.g., in golf shoes), IPN coatings with crosslinkable systems, and in any application that requires post-crosslinking of the polymer.

EXAMPLES

The following examples are only representative of the methods and materials for use in golf ball compositions and golf balls of this invention, and are not to be construed as limiting the scope of the invention in any way.

Example 1

Golf Ball Having a Urethane-Epoxy IPN Present in the Cover Layer

The golf ball of Example 1 was prepared with a 1.585 inch (about 4.03 cm) wound core around a fluid-filled center. The golf ball had a finished diameter of about 1.68 inches (about 4.27 cm). The golf ball of Example 1 included an IPN of a polyurethane and an epoxy polymer, wherein the epoxy polymer component was about 5% of the IPN and the polyurethane component was about 95% of the IPN. The urethane precursor package in Example 1 included Vibrathane B-821 prepolymer, 1,4-butanediol, and T-12 dibutyltin dilaurate catalyst. The molar proportion of isocyanate groups in the Vibrathane prepolymer to hydroxyl groups in the diol was in about a 1:0.95 ratio. The epoxy precursor package included an epoxy resin (DER 331) and a $BF_3$ catalyst/curing agent to facilitate self-polymerization and self-crosslinking to form an epoxy network. In order to limit the possibility of the polyurethane being further chain extended with the curing agent intended for curing the epoxy component, the epoxy curing agent was chosen to be catalytic and substantially unreactive with the polyurethane component. The epoxy curing agent chosen to prepare the ball of Example 1 was a $BF_3$:4-chlorobenzenamine catalyst complex. Other epoxy curing agents include, but are not limited to, oxides, such as magnesium oxide, or aluminum oxide; tertiary amines, such as N,N-dimethylaminopyridine, or benzyldimethylamine; imidazoles, such as 2-ethyl-4-methylimidazole; and phosphines, such as triphenylphosphine, or tributylphosphine.

The respective precursor packages were mixed separately until a sufficient viscosity was achieved to allow mixing by hand, or from about 8,000 cPs to 35,000 cPs, after which the precursor packages were mixed together and cast as the cover layer on wound cores to form the golf ball of Example 1. The total gelation time was about 80 seconds.

TABLE 1

| Cover/Ball Characteristics | Control | Example 1 |
| --- | --- | --- |
| Urethane component BD precursor package | Vibrathane/BD (1:0.95) + 0.01% T-12 catalyst | Vibrathane/BD (1:0.95) + 0.01% T-12 catalyst (95%) |
| Epoxy component precursor package | — | DER 331/10 pph $BF_3$ catalyst (5%) |

TABLE 1-continued

| Cover/Ball Characteristics | Control | Example 1 |
|---|---|---|
| Coefficient of Restitution | 0.81 | 0.81 |
| Corrected Compression | 87 | 90 |
| Material Hardness (Shore D) | 38 | 31 |
| Cover Hardness (Shore D) | 46 | 43 |
| Initial Velocity (ft/sec) | 255.5 | 255 |
| $T_g$ peak (° C., measured by DSC) | −71 | −67 |
| $T_g$ width (° C., measured by DSC) | 17 | 24 |

Vibrathane is an isocyanate end-capped polyurethane prepolymer, in this case VIBRATHANE B-821, which is made from MDI and a 2,000 $M_N$ PTMEG polyol and is available commercially from Crompton Uniroyal Chemical Company, Inc., of Middlebury, CT; BD represents 1,4-butanediol, which is available commercially from BASF of Parsippany, NJ; T-12 represents a dibutyl tin dilaurate catalyst, which is available commercially from Air Products of Allentown, PA; DER # 331 represents an epoxy resin based on a diglycidyl ether of bisphenol A (DGEBA) and is commercially available from Dow Chemical Company of Midland, MI; $BF_3$ catalyst represents a trifluoroboron-4-chlorobenzenamine catalyst complex and is commercially available from Air Products of Allentown, PA.

Example 2

Golf Ball Having a Urethane-Polybutadiene Diacrylate IPN Present in the Cover Layer The golf ball of Example 2 includes an IPN of a polyurethane and a polybutadiene copolymer, which is prepared with a 1.585 inch (about 4.03 cm) wound core around a fluid-filled center. Note that the IPN's disclosed in the Examples and specification herein can be used in any golf ball construction. The golf ball has a finished diameter of about 1.68 inches (about 4.27 cm). The golf ball of Example 2 includes an IPN of a polyurethane and a polybutadiene diacrylate copolymer, wherein the polybutadiene copolymer component is about 10% of the IPN and the polyurethane component is about 90% of the IPN. The urethane precursor package in Example 2 includes Vibrathane B-821 prepolymer, 1,4-butanediol, and T-12 dibutyltin dilaurate catalyst. The molar proportion of isocyanate groups in the Vibrathane prepolymer to hydroxyl groups in the diol is in about a 1:0.95 ratio. The polybutadiene diacrylate copolymer precursor package includes butadiene monomer or a polybutadiene resin, a diacrylate crosslinking agent, and an initiator to facilitate crosslinking to form a polybutadiene diacrylate network. In order to limit the possibility of degradation of, or interference with, the polyurethane chain extension reaction, the polybutadiene diacrylate copolymer crosslinking initiator preferably is chosen to be substantially unreactive with the polyurethane. The initiator chosen to prepare the ball of Example 2 is a peroxide initiator, particularly dibenzoyl peroxide.

The respective precursor packages are mixed separately until a sufficient viscosity is achieved to allow mixing by hand, or from about 8,000 cPs to 35,000 cPs, after which the precursor packages are mixed together and cast as the cover layer on wound cores to form the golf ball of Example 2.

Example 3

Golf Ball Having a Urethane-Acrylate IPN Present in the Cover Layer

The golf ball of Example 3 is prepared with a 1.585 inch (about 4.03 cm) wound core around a fluid-filled center. Again, note that the IPN's disclosed in the Examples and specification herein can be used in any golf ball construction. The golf ball has a finished diameter of about 1.68 inches (about 4.27 cm). The golf ball of Example 3 includes an IPN of a polyurethane and an acrylate polymer, wherein the acrylate polymer component is about 10% of the IPN and the polyurethane component is about 90% of the IPN. The urethane precursor package in Example 3 includes Vibrathane B-821 prepolymer, 1,4-butanediol, and T-12 dibutyltin dilaurate catalyst. The molar proportion of isocyanate groups in the Vibrathane prepolymer to hydroxyl groups in the diol is in about a 1:0.95 ratio. The acrylate precursor package includes methyl methacrylate monomer, optionally a crosslinking agent (such as a diacrylate), and an initiator to facilitate polymerization (and optionally crosslinking) to form a methyl methacrylate polymer (and optionally network). In order to limit the possibility of degradation of, or interference with, the polyurethane chain extension reaction, the methyl methacrylate polymerization initiator is chosen to preferably be substantially unreactive with the polyurethane. The initiator chosen to prepare the ball of Example 3 is a free radical initiator, such as azobisisobutyronitrile (AIBN).

The respective precursor packages are mixed separately until a sufficient viscosity is achieved to allow mixing by hand, or from about 8,000 cPs to 35,000 cPs, after which the precursor packages are mixed together and cast as the cover layer on wound cores to form the golf ball of Example 3.

Example 4

Golf Ball Having a Urethane-Epoxy IPN Present in the Cover Layer

The golf ball of Example 4 is prepared with a 1.585 inch (about 4.03 cm) wound core around a fluid-filled center. Yet again, note that the IPN's disclosed in the Examples and specification herein can be used in any golf ball construction. The golf ball has a finished diameter of about 1.68 inches (about 4.27 cm). The golf ball of Example 4 includes an IPN of a polyurethane and an epoxy polymer, wherein the epoxy polymer component is about 10% of the IPN and the polyurethane component is about 90% of the IPN. The urethane precursor package in Example 4 includes Vibrathane B-821 prepolymer, 1,4-butanediol, and optionally a catalyst, such as T-12 dibutyltin dilaurate. The molar proportion of isocyanate groups in the Vibrathane prepolymer to hydroxyl groups in the diol is in about a 1:0.95 ratio. The epoxy precursor package includes an epoxy resin (DER 331), a $BF_3$ catalyst/curing agent to facilitate self-polymerization and self-crosslinking to form an epoxy network, and a catalyst to facilitate occasional interreactions of the urethane and the epoxy precursors or networks in the form of oxazolidone functional groups. In order to limit the possibility of the polyurethane being further chain extended with the curing agent intended for curing the epoxy component, the epoxy curing agent is chosen to preferably be catalytic and substantially unreactive with the polyurethane component. The epoxy curing agent chosen to prepare the ball of Example 4 is a $BF_3$:4-chlorobenzenamine catalyst complex. The oxazolidone formation catalyst chosen to prepare the ball of Example 4 is ethylmethyl imidazole.

The respective precursor packages are mixed separately until a sufficient viscosity is achieved to allow mixing by hand, or from about 8,000 cPs to 35,000 cPs, after which the precursor packages are mixed together and cast as the cover layer on wound cores to form the golf ball of Example 4.

It is to be understood that the invention is not to be limited to the exact configuration as illustrated and described herein. For example, it should be apparent that a variety of materials would be suitable for use in the composition or method of making the golf balls according to the Detailed Description of the Preferred Embodiments. Accordingly, all expedient modifications readily attainable by one of ordinary skill in the art from the disclosure set forth herein, or by routine experimentation therefrom, are deemed to be within the spirit and scope of the invention as defined by the appended claims.

TABLE 2

| Sample ID | Amount of Polyurea Prepolymer/Clearlink 1000 (%) | Amount of Urea Acrylate (%) |
|---|---|---|
| 0% IPN | 100 | 0 |
| 10% IPN | 90 | 10 |
| 20% IPN | 80 | 20 |
| 30% IPN | 70 | 30 |
| 40% IPN | 60 | 40 |
| 100% IPN | 0 | 100 |

TABLE 3

| Sample ID | DMA Tg (° C.) Thermal Cure | Relative Crosslink density* (1000 moles/cc) Thermal Cure | DMA Tg (° C.) Before Radiation | DMA Tg (° C.) Radiation Cure | Relative Crosslink density* (1000 moles/cc) Radiation Cure |
|---|---|---|---|---|---|
| 0% IPN | −44° C., 80° C. | — | −50° C., 71° C. | −50° C., 73° C. | — |
| 10% IPN | −47° C., 81° C. | — | −42° C., 70° C. | −41° C., 74° C., 120° C. | — |
| 20% IPN | −46° C., 72° C., 135° C. | — | −48° C. | −50° C., 72° C., 104° C. | 0.01387 |
| 30% IPN | −46° C., 72° C., 131° C. | 0.00358 | −37° C., 43° C. | −42° C., 70° C., 111° C. | 0.0243 |
| 40% IPN | −46° C., 66° C., 121° C. | 0.0124 | — | −42° C., 66° C. | 0.058 |
| 100% IPN | −50° C., 73° C. | 0.83 | — | −42° C., 62° C. | 0.5588 |

*Relative crosslink density is a crosslink density in the sample as compared to 0% IPN crosslink density.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions of the present invention may be used in a variety of golf equipment, for example, golf shoes for sole applications, as well as in inserts for golf putters. Such modifications are also intended to fall within the scope of the appended claims.

Example 5

Electron Beam Cure of Polyurea Prepolymer/Urea Acrylate

Various mixtures containing polyurea prepolymer/curative and urea acrylate were cured using either electron beam radiation or thermal radiation and the DMA of resulting interpenetrating polymer networks were analyzed and compared with respect to their crosslink density. The curative in the polyurea prepolymer/curative mixture is CLEARLINK 1000, which can have a polyurea prepolymer/curative mixture ratio of between about 1:0.75 to about 1:1.25. The DMA results of the IPNs were obtained using a TA Instruments 2980 unit, using the following parameters: tensile film mode; 20 µm amplitude; 1 Hz frequency; 10 cNm clamping force; −100 to 250° C.; 3° C./min heating rate; and 15×6.5× 0.6 (mm) sampling dimensions. The sample compositions are summarized below in Table 2 and the DMA results are summarized below in Table 3.

What is claimed is:

1. A method of forming a portion of a golf ball comprising the steps of:
   providing at least a first polymeric component and a second polymeric component, each polymeric component comprising at least one monomer, oligomer, prepolymer, or a combination thereof;
   sufficiently polymerizing each polymeric component sequentially or simultaneously to form a polymer or polymer network;
   crosslinking each polymer or polymer network to the other polymer or polymer network to form an interpenetrating polymer network ("IPN"); and
   forming the IPN into the portion of the golf ball,
   wherein each polymeric component of the mixture is polymerized by exposing the mixture to at least one energy source, at least one initiator present in an amount from about 0.1 to about 10 parts per hundred of total polymer component, or a combination thereof for a time sufficient to polymerize the polymeric component.

2. The method of claim 1, wherein the at least one energy source is selected from the group consisting of microwave radiation, infrared radiation, visible radiation, ultraviolet radiation, x-ray radiation, gamma radiation, electron beam radiation and a combination thereof.

3. The method of claim 1, wherein the at least one initiator is selected from the group consisting of a thermal free radical initiator, a photoinitiator, a cationic initiator, and a mixture thereof.

4. The method of claim 3, wherein the thermal free radical initiator is selected from the group consisting of an azo compound, a peroxide, a persulfate, a redox initiator, and mixtures thereof.

5. The method of claim 3, wherein the photoinitiator is selected from the group consisting of a peroxide, an azo compound, quinine, benzophenone, nitroso compound, acyl halide, hydrazone, a mercapto compound, a pyrylium compound, a triacylimidazole, an organophosphorus compounds, a bisimidazole, a chioroalkyltriazine, a benzoate, a benzoyl compound, a benzoin ether, a benzil ketal, a thioxanthone, an acetophenone derivative, a ketone, a metallocene, a hexafluorophosphate salt, a sulfonium salt, a diacrylate, a polyoi, a pyrollidone, and mixtures thereof.

6. The method of claim 3, wherein the cationic initiator is selected from the group consisting of a Group IA organo compound, Group IIA organo compound, aryl sulfonium salt, hexafluorometallic salt, Bronsted acid, Lewis acid, and mixtures thereof.

7. The method of claim 1, wherein the initiator is present in an amount from about 0.01 to about 15 parts per hundred of total polymer component.

8. The method of claim 1, wherein the initiator is present in an amount from about 0.1 to about 10 parts per hundred of total polymer component.

9. The method of claim 1, wherein the polymerization of each polymeric component is subsequent or simultaneous with the crosslinking of each polymer or polymer network to the other polymer or polymer network.

10. The method of claim 1, wherein the first polymeric component is polymerized in the presence or absence of a second polymeric component to form a first polymer or first polymer network.

11. The method of claim 10, wherein the at least a second polymeric component is polymerized in the presence of the first polymeric component or the first polymer or first polymer network to form a second polymer or second polymer network.

12. The method of claim 11, wherein crosslinking of the first polymer or first polymer network to the second polymer or second polymer network occurs subsequently or simultaneously with the polymerization of the second polymeric component to form the second polymer or second polymer network.

13. The method of claim 1, wherein the polymerization of each polymeric component and the crosslinking of each polymer or polymer network to the other polymer or polymer network occurs simultaneously to form an IPN.

14. The method of claim 1, wherein the first polymeric component and the second polymeric component comprise monomeric, oligomeric or prepolymeric precursors of vinyl resins; polyolefins; polyurethanes; polyureas; polyamides; polyamide/polyurethane copolymers, polyamide/polyurea copolymers, epoxy-end-capped polyurethanes, epoxy-end-capped polyureas, polyamide/polyurethane ionomers, polyamide/polyurea ionomers, acrylic resins; olefinic rubbers; polyphenylene oxide resins; polyesters; blends of vulcanized, unvulcanized or non-vulcanizable rubbers with polyethylene, polypropylene, polyacetal, nylon, polyesters, or cellulose esters; or polymers or copolymers possessing epoxy-containing, or post-polymerization epoxy-functionalized repeat units.

15. The method of claim 1, wherein the portion of the golf ball formed from the IPN is a core, intermediate layer or cover layer.

16. The method of claim 1, wherein the portion of the golf ball comprises a cover layer.

17. A method of forming a golf ball having a center, a cover, and an intermediate layer disposed between the center and the cover comprising the steps of:

providing at least a first polymeric component and a second polymeric component, each polymeric component comprising at least one monomer, oligomer, prepolymer, or a combination thereof;

sufficiently polymerizing each polymeric component sequentially or simultaneously to form a polymer or polymer network;

crosslinking each polymer or polymer network to the other polymer or polymer network to form an interpenetrating polymer network ("IPN"); and forming an intermediate layer from the IPN, wherein each polymeric component of the mixture is polymerized by exposing the mixture to at least one energy source, at least one initiator, or a combination thereof for a time sufficient to polymerize the polymeric component.

18. The method of claim 17, wherein the initiator is present in an amount from about 0.01 to about 15 parts per hundred of total polymer component.

19. The method of claim 17, wherein the initiator is present in an amount from about 0.1 to about 10 parts per hundred of total polymer component.

20. A method of forming a portion of a golf ball comprising the steps of:

providing at least a first polymeric component and a second polymeric component, each polymeric component comprising at least one monomer, oligomer, prepolymer, or a combination thereof;

sufficiently polymerizing each polymeric component sequentially or simultaneously to form a polymer or polymer network;

crosslinking each polymer or polymer network to the other polymer or polymer network to form an interpenetrating polymer network ("IPN"); and forming the IPN into the portion of the golf ball, wherein each polymeric component of the mixture is polymerized by exposing the mixture to at least one energy source, at least one thermal free radical initiator selected from the group consisting of an azo compound, a peroxide, a persulfate, a redox initiator, and mixtures thereof, or a combination thereof for a time sufficient to polymerize the polymeric component.

* * * * *